Oct. 4, 1966  L. SHABRAM  3,276,940
HEAT SEALING WRAPPING DEVICE
Filed July 8, 1963  2 Sheets-Sheet 1

INVENTOR
LYLE SHABRAM
BY
*Eckhoff and Slick*
ATTORNEYS

Oct. 4, 1966

L. SHABRAM 3,276,940

HEAT SEALING WRAPPING DEVICE

Filed July 8, 1963

INVENTOR
LYLE SHABRAM
BY
*Eckhoff and Slick*
ATTORNEYS

United States Patent Office 3,276,940
Patented Oct. 4, 1966

3,276,940
HEAT SEALING WRAPPING DEVICE
Lyle Shabram, Seaside, Calif., assignor to James M. Vanlandingham, doing business as Rol-Seal Company
Filed July 8, 1963, Ser. No. 293,349
2 Claims. (Cl. 156—515)

This invention relates in general to a heat sealing method and device of the type shown in Patent 3,016,673 and more particularly to an improvement on a device of this type which permits thermoplastic film to be wrapped about objects, especially sandwiches, and sealed.

It is an object of this invention to proivde a device which is capable of wrapping objects with a thermoplastic material and heat sealing such objects therein.

Another object of this invention is to provide a device of the foregoing type which may be used to heat seal adjacent sheets of thermoplastic film in such a manner as to form a firm seal in the form of a bead where the two sheets are welded.

Still a further object of this invention is to provide a method for heat healing adjacent sheets of film to form a bead at the point where they are welded, the position and method of formation of the bead being carefully controlled so as to minimize wastage of the film and so as to insure a uniform and dependable seal at a predetermined point.

Further objects and advantages of this invention, if not specifically set forth, will become apparent during the course of the description which follows.

Figure 1:
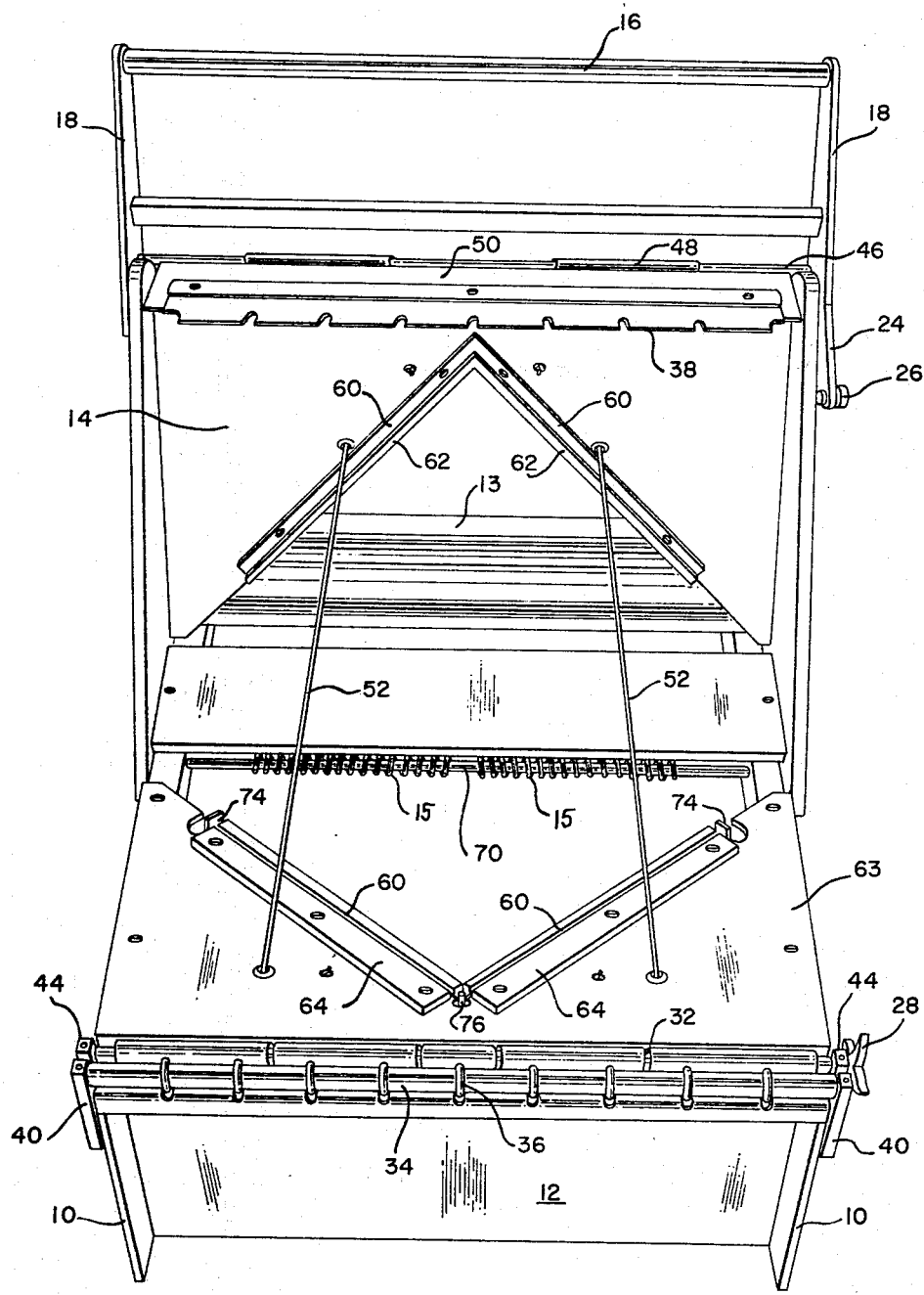
FIGURE 1 is a perspective view of a device operating generally on the principles of that of Patent 3,016,673 as seen from the front of the machine with the jaws opened.
Figure 3:
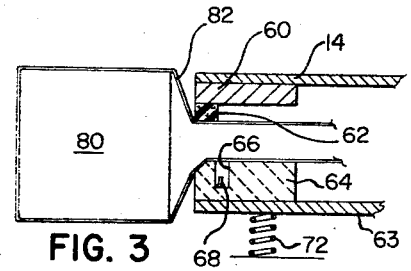
FIGURES 3 through 7 are schematic representations of the sequence of steps constituting the method of this invention.
Figure 2:
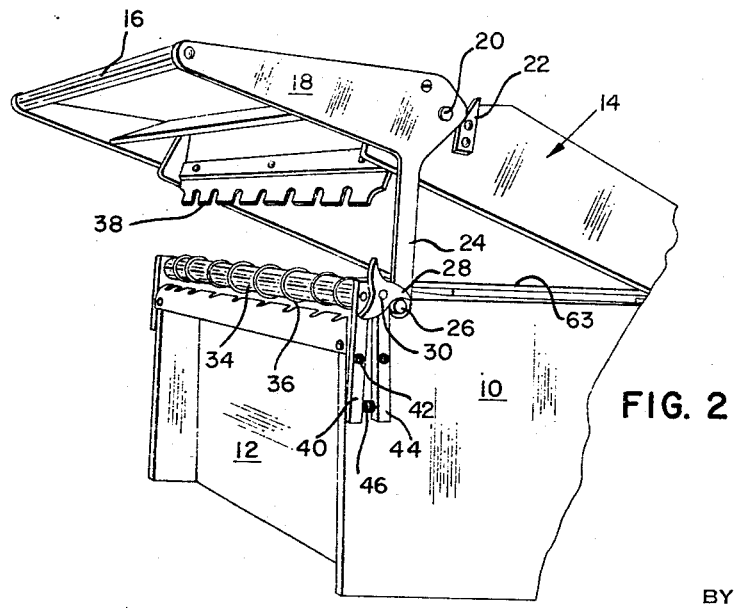
FIGURE 2 is a fragmentary perspective of the machine of this invention showing the jaws in the process of being opened after completion of a sealing cycle.

Referring now to the drawings wherein like characters refer to like parts throughout, there is shown in FIGURES 1 and 2 a machine similar to that described in Patent 3,016,673 having upright side walls 10 and end walls 12 and a roll of suitable thermoplastic film 13 mounted transversely thereof behind the upper pivotally mounted jaw plate 14 which is normally urged upwardly by counterbalance springs 15. Similar to the structure of the aforementioned patent, there is provide a handle 16 which is supported by brackets 18 pivoted on pins 20. The handle is prevented from being pivoted clockwise, as seen in FIGURE 2, by stops 22 which bear against the shoulders of the brackets 18 so as to permit the handle only to be pivoted in a counterclockwise direction from the position shown in FIGURE 2. One of brackets 18 supports a downwardly depending extension 24 upon which is rotatably mounted roller 26 which contacts the star wheel 28 to rotate it counterclockwise, as seen in FIGURE 2, both when the jaw plate 14 is being lifted, as shown in this figure. The star wheel is fixed to the pin 30 which extends from the roller 32, which is preferably covered with elastomeric sleeves to ensure friction with the film fed between roller 32 and roller 34, the latter having rubber O-rings 36 which also assist in gripping and advancing the plastic film as it is fed by the reaction of the notched flange 38. Roller 34 is journalled in brackets 40 which are pivoted as at 42. The roller 32 is journaled in brackets 44 which are fixed relative to the side walls 10 of the device. Compression springs 46 normally tend to urge roller 34 toward roller 32.

Transverse rod 46 having spaced rubber sleeves 48 is positioned to bear against the transverse bracket 50 upon which the flange 38 is supported. The film is threaded between the rod 46 and the upper edge of the bracket 50 and as the entire jaw plate 14 is swung in a counterclockwise direction from the position shown in FIGURE 2, the film will be pulled from the supply in a fashion similar to that described in connection with the aforementioned patent and guided by elastic strings 52.

Turning now to the method and apparatus for severing the film, wherein significant departures from prior art methods and apparatus have been made, there is seen secured about the triangular cut-out portion of the jaw plate 14 a pair of rectangular blocks 60 formed into a V which provides support for the silicone rubber pads 62. Secured about the triangular aperture of the lower jaw plate 63 are the asbestos cement blocks 64 which have lengthwise grooves 66 which, when the jaws, represented by pads 62 and blocks 64, are in an open position, surround the heated ribbons 68 on three sides. The ribbons may be resistance heated by about 10 amperes of current supplied from a 6.3 volt transformer if Nichrome ribbon about $\frac{1}{1000}$ inch thick and $\frac{1}{8}$ inch wide is used. The heated ribbon is spaced $\frac{1}{64}$ inch to $\frac{1}{32}$ inch from the mating jaw surfaces.

The lower jaw plate 63 is pivotally mounted about the rod 70 which runs transversely of the upstanding spaced side walls 10 of the machine. Compression springs 72 are mounted in phenolic blocks, not shown, which support terminal posts 74 and 76; the springs urge the jaw plate 63 up to a point where a stop (not shown) is contacted and where the lower surface of the plate rests about $\frac{1}{4}$ to $\frac{3}{4}$ inch above its lowermost position.

In the schematic drawings, FIGURES 3 through 7, the torsion springs 72 have been represented as compression springs so that their function will be apparent in the schematic drawing.

The Nichrome ribbons 68 are heated at all times and run from the upstanding terminal posts 74 at either end of the triangular opening in the jaw plate 63 to the common center terminal post 76 and, as can be seen in the schematic FIGURES 4 through 7, terminal posts 74 and 76 are supported independently of blocks 64 and the plate 63 and remain fixed while the asbestos cement blocks 64 are being depressed.

Figure 6:
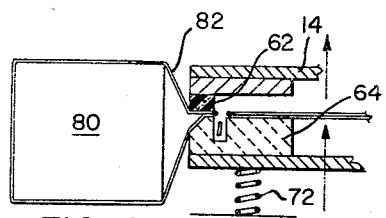
Figure 4:
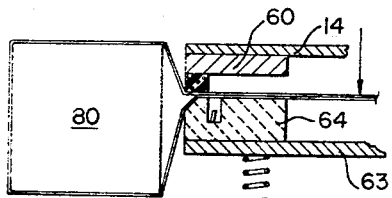
Figure 7:
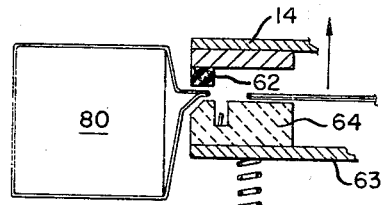
Figure 5:
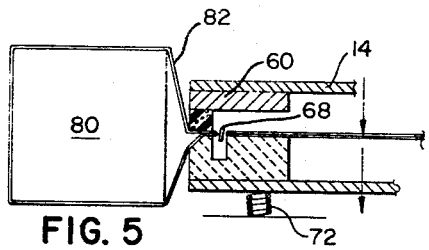

The sequence of actions can be seen in the schematic FIGURES 4 through 7 wherein the object 80 to be enveloped with the thermoplastic film and sealed therein appears at the left, film 82 having been wrapped thereabout in a manner analogous to that described in connection with the device of Patent 3,016,673. Depressing the handle and closing the jaws represented by members 62 and 64 will bring opposite ends of the film 82 parallel, as seen in FIGURE 4. Continued downward motion of the jaw plate 14 brings the film layers into contact with one another and thereafter the two layers are moved into contact with the stationary ribbon (FIGURE 5) as lower jaw plate 63 is depressed against the resistance of spring 72. As the ribbon hits the film, the film is severed and melts to form a bead where the two sheets are welded together. The rubber pad 62 and the asbestos cement block 64 which hold the film are cooler than the point at which the film is sealed, preventing the film from sealing other than right along the bead which is formed at a point spaced somewhat from the vertical plane formed by the inner faces of intersecting members 62 and 64. In FIGURE 6 the jaw plate 14 has been released and the spring 72 causes the asbestos block 64 to follow the movements of the jaw plate 14, the film remaining clamped between the jaws represented by members 62 and 64. During this period of time, the seal cools and sets and, as seen in FIGURE 7, the sealed area is then released.

Figure 8:
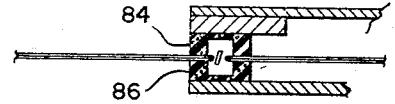
FIGURE 8 is an enlarged fragmentary view of modified jaws intended for controlling the formation of a bead seal along two opposed edges of severed film.

In schematic FIGURE 8, a slightly modified structure is shown wherein two silicone rubber pads 84 and 86 each have a channel similar to that of the lower jaw shown in FIGURES 3 through 7. The formation of a bead at either side is controlled, rather than as in the case of the structure described previously, where the bead is formed in the controlled fashion only on the one side. That is, the film is gripped by mating jaws formed by members 62 and 64 and moved into contact with the heated ribbon which is spaced about 1/64 to 1/32 inch from the vertical planes formed by the nearest vertical faces of the mating jaws. This provides the desired control over the bead formation with a resultant stronger seal and accurate control over its location.

Obviously, many modifications and variations may be made without departing from the spirit and scope of this invention, and therefore only such limitations should be imposed as are indicated in the appended claims.

I claim:
1. In a device for wrapping a thermoplastic film about an article and heat sealing overlying layers one to another, the improvements comprising:
   (a) a first jaw and a second jaw for gripping adjacent layers of said thermoplastic film and for pressing said layers of film into contact with one another along a line of fusion and severance;
   (b) means mounting said jaws for pivotal movement to the said device whereby pressure applied to one jaw may be transmitted to the other of said jaws and both jaws pressed together; and
   (c) an electrically heated wire spaced between about 1/64 and 1/32 inch from the nearest point at which said jaws contact one another, said wire being mounted independently of said jaws and being so positioned that when said jaws are brought into contact with one another while two layers of film are therebetween and said jaws are pivoted together, said film will be forced against said wire and will be contacted and severed, the lowermost of said jaws being a heat resistant block having a generally U-shaped groove therein, said electrically heated wire being positioned at the bottom of the said U-shaped groove when the said jaw is in a normal relaxed position and no pressure is being applied thereto.

2. The structure of claim 1 wherein one of the said jaws is an asbestos cement block having a generally U-shaped groove therein and wherein the second of the said jaws is a silicone rubber pad, said silicone rubber pad meeting the other of the said jaws along an edge of the generally U-shaped channel and wherein said electrically heated wire is positioned at the bottom of the said generally U-shaped channel when the said jaws are in a normally relaxed position and when no pressure is being applied thereto.

References Cited by the Examiner

UNITED STATES PATENTS

| | | | |
|---|---|---|---|
| Re. 24,396 | 11/1957 | Rumsey | 53—390 |
| 2,827,743 | 3/1958 | Rumsey | 53—219 |

FOREIGN PATENTS 860,803  2/1961  Great Britain.

EARL M. BERGERT, *Primary Examiner.*

DOUGLAS J. DRUMMOND, *Examiner.*